3,309,176
LOW TEMPERATURE SYNTHESIS OF
COMPOUND SEMICONDUCTORS
Alfred Mayer, Plainfield, N.J., assignor to Radio Corporation of America, a corporation of Delaware
No Drawing. Filed Mar. 29, 1961, Ser. No. 99,029
4 Claims. (Cl. 23—204)

This invention relates to low temperature synthesis of compound semiconductors, and more particularly, to an improved method of synthesizing compounds in which at least one element is selected from Group III of the Periodic Table according to Mendeleyeev and at least one other element is selected from Group V of the Periodic Table.

The so-called III–V compounds are of interest in making semiconductor devices such as transistors and diodes partially because they remain operative at relatively high temperatures. However, the preparation of these III–V compounds in sufficiently pure form to be used in transistors has proved to be a difficult problem. One of the difficulties encountered in preparing these compounds has been that in order to react the metallic and nonmetallic elements together to synthesize the compounds, very high temperatures are required. At the required high temperatures, impurities are vaporized from the walls of the reaction vessel and become incorporated into the compounds which are being prepared. Also, some of the elements used in making the compounds become relatively reactive with the materials of the crucibles and containers which have been used for synthesizing the compounds.

In order to efficiently prepare gallium arsenide, for example, directly from a mixture of its elements, the mixture should be heated to a temperature of about 1240° C., the melting point of gallium arsenide. This operation is customarily carried out in a quartz apparatus and, at this high temperature, serious contamination by silicon results because of the great affinity of gallium for quartz at this temperature.

Because the above described contamination problems and others, such as danger of explosion due to high pressures developed within the reaction vessel, are a result of high temperatures, it is evident that some of the problems could be greatly reduced if the reactions could be carried out at substantially lower temperatures.

One object of the present invention is to provide an improved method of making semiconducting III–V compounds utilizing lower reaction temperatures.

Another object of the present invention is to provide a method of making III–V compounds of relatively high purity.

A feature of the present invention is the provision of an improved method of synthesizing polycrystalline III–V compounds comprising forming an intimate mixture of the metallic and nonmetallic elements required, within a closed and evacuated quartz tube or other similar reaction vessel, introducing an atmosphere of gas containing a halogen from the class consisting of chlorine, bromine and iodine, and then heating the reaction mixture until the elements are substantially completely reacted. Under these conditions, it has been found that complete reaction can be obtained at much lower temperatures than are possible for this type of reaction without using the halogen catalyst.

An example of a synthesis in accordance with the present invention will now be given as applied to the preparation of gallium arsenide. A quantity of granulated gallium is mixed with a slight of powdered arsenic and the mixture is charged into a quartz tube, sealed at one end having the diameter of the polycrystalline bar which is desired. The tube is selected of such size that it has an empty space of at least 1 or 2 cm. at one end. The tube is evacuated and a small amount of chlorine gas is admitted such that the amount is in the range of 0.5 to 1 mg. chlorine per gram of gallium. A neutral gas, such as argon or helium may then be added so that the total pressure within the tube is about ½ to ¾ atmosphere, although the addition of the neutral gas is not absolutely necessary. The neutral gas, however, is preferred because it seems to produce a denser product.

The open end of the tube is then sealed and the tube is inserted in a furnace such that the end which contains the mixture of gallium and arsenic is at the highest temperature. The temperature range is preferably 550° to 650° C. while the other end is at a temperature which is about 15° to 50° C. lower. Heating is continued from 12 to 16 hours and at the end of this period the tube is removed from the furnace and cooled. A bar of polycrystalline gallium arsenide forms at the hot end and excess arsenic collects at the cooler end. The bar of gallium arsenide may be removed from the tube by cracking the quartz.

The chlorine serves as a catalyst in forming the gallium arsenide and permits the employment of temperatures very much lower than would ordinarily be necessary without the catalyst. Because of the lower temperatures used, contamination from the quartz container is greatly reduced since at the lower temperatures used, gallium is not nearly so reactive with silicon. Furthermore, at these lower temperatures, less impurity which may be present in the walls of the quartz tube is driven out of the walls and into the product.

The chlorine can be introduced in other forms. For example, hydrogen chloride vapor can be used just as effectively as chlorine gas and easily decomposable, and volatile chlorides such as mercuric chloride, stannic chloride or ammonium chloride can also be used. Other halogens can also be used, that is, bromine or iodine either is elemental forms or as compounds.

Compounds other than gallium arsenide can also be synthesized by the method of the present invention. The method is generally applicable to the synthesis of any III–V compound such as gallium phosphide, or indium phosphide or indium arsenide, for example, and to the synthesis of compounds containing more than one element from each group. The method offers certain advantages over other methods such as vapor transport, for example in that time required to form a given weight of compound is much less.

A polycrystalline bar prepared by this method is suitable for conversion to single crystalline material by any well-known method such as the "floating zone" technique.

What is claimed is:
1. The method of synthesizing a compound selected from the group consisting of gallium arsenide, gallium phosphide, indium arsenide and indium phosphide comprising providing an intimate mixture of powdered elements of one of said compounds in approximately stoichiometric proportions but with the more volatile element of said compound in excess, within a closed system, evacuating said system, introducing into said system a small amount of a halogen from the group consisting of chlorine, bromine and iodine, heating a portion of said closed system which contains said powdered elements to a temperature and for a time sufficient to completely react said powdered elements to form said compound, utilizing said halogen as a catalyst, while maintaining another portion of said system at a somewhat lower temperature such that excess of said more volatile element is condensed therein, said heating temperatures being substantially below the melting point of said compound.

2. The method according to claim 1 in which the Group III element is gallium, the Group V element is arsenic and the halogen is chlorine.

3. A method according to claim 2 in which the mixture of elements is heated to a temperature between about 550° C. to 650° C. and the amount of chlorine is about .5 to 1 mg. per gram of gallium.

4. A method according to claim 1 in which, in addition to the halogen atmosphere there is also present sufficient neutral gas to raise the total pressure within the tube before heating to about one-half to three-quarters atmosphere.

References Cited by the Examiner

UNITED STATES PATENTS 1,450,464  4/1923  Thomson _____ 23—208 X
2,862,787  12/1958  Seguin et al. _____ 23—14

OTHER REFERENCES

Antell et al.: "Journal of the Eelectrochemical Society," vol. 106, pp. 509–510 (1959).

MILTON WEISSMAN, *Primary Examiner.*

OSCAR R. VERTIZ, *Examiner.*

UNITED STATES PATENT OFFICE
CERTIFICATE OF CORRECTION

Patent No. 3,309,176                                   March 14, 1967

Alfred Mayer

It is hereby certified that error appears in the above numbered patent requiring correction and that the said Letters Patent should read as corrected below.

Column 1, line 69, after "slight" insert -- excess --; column 4, list of References Cited, under UNITED STATES PATENTS, add the following references:

| | | | |
|---|---|---|---|
| 2,798,989 | 7/1957 | Welker | 23-204 |
| 2,966,424 | 12/1960 | Ruehrwein et al. | 23-204 |
| 2,966,426 | 12/1960 | Williams et al. | 23-204 |
| 2,974,064 | 3/1961 | Williams et al. | 23-204 |

Signed and sealed this 15th day of October 1968.

(SEAL)
Attest:

Edward M. Fletcher, Jr.                               EDWARD J. BRENNER

Attesting Officer                                             Commissioner of Patents